United States Patent [19]

Johns et al.

[11] Patent Number: 4,617,636
[45] Date of Patent: Oct. 14, 1986

[54] PROTECTION OF ELECTRICAL POWER SUPPLY SYSTEMS

[75] Inventors: Allan T. Johns, Corsham; Michael A. Martin, Bradford-on-Avon, both of England

[73] Assignee: National Research Development Corporation, London, England

[21] Appl. No.: 471,333

[22] Filed: Mar. 2, 1983

[30] Foreign Application Priority Data

Mar. 3, 1982 [GB] United Kingdom ............... 8206253

[51] Int. Cl.⁴ ............... G01R 31/08; G01R 27/08; H02H 3/42
[52] U.S. Cl. .............................. 364/482; 324/52; 361/79; 361/80
[58] Field of Search .......................... 361/80, 79, 82; 364/482, 483, 576; 324/51, 52

[56] References Cited

U.S. PATENT DOCUMENTS

| | | | |
|---|---|---|---|
| 3,599,044 | 8/1971 | Takemura et al. | 361/80 X |
| 3,965,394 | 6/1976 | Heinzman | 361/110 X |
| 4,148,087 | 4/1979 | Phadke | 361/80 |
| 4,261,038 | 4/1981 | Johns et al. | 364/482 |
| 4,276,605 | 6/1981 | Okamoto et al. | 364/483 |
| 4,281,386 | 7/1981 | Kondow et al. | 361/79 X |
| 4,300,182 | 11/1981 | Schweiter, III | 361/79 |
| 4,329,727 | 5/1982 | Premerlani | 361/80 |
| 4,352,136 | 9/1982 | Ericksson | 361/79 X |
| 4,455,612 | 6/1984 | Grigis et al, | 361/80 X |
| 4,466,071 | 8/1984 | Russell, Jr. | 364/482 X |

OTHER PUBLICATIONS

A. Wiszniewski, *How to Reduce Errors of Distance Fault Locating Algorithms*, IEEE Transactions, vol. PAS-100, Dec. 12, 1981.

A. Wiszniewski, *Signal Recognition in Protective Relaying*, IEE International Conference, Jun. 1980.

Primary Examiner—Errol A. Krass
Assistant Examiner—Edward R. Cosimano
Attorney, Agent, or Firm—Cushman, Darby & Cushman

[57] ABSTRACT

A fault in a section of an electrical power supply line is detected by measurement of voltage and current, filtering out high frequency components, and calculating approximations of Fourier transforms of a time window of the voltage and current at a predetermined frequency modified by a continuous phase change at that frequency and then calculating the impedance of the section from the modified Fourier transforms of voltage and current (FIG. 2).

5 Claims, 4 Drawing Figures

PROTECTION OF ELECTRICAL POWER SUPPLY SYSTEMS

BACKGROUND OF THE INVENTION

This invention relates to protection arrangements for electrical power supply systems of the type which operate by detecting changes in impedance levels.

In electrical power transmission and distribution systems, it is customary for each end of each section of the system, such as a transformer, a power line and the like, to be provided with a protective device which disconnects its associated section if a fault occurs therein. It is, of course, important for disconnection to take place only if the fault occurs within the section.

Protection devices of this type are based on measuring, from a knowledge of the variation of the voltages and currents in each phase at a measuring point, the impedance presented to a protective relay. Under fault conditions, the impedance measured generally differs from that under no-fault conditions and it is possible to use this fact to trip one or more poles of a circuit breaker if a system fault develops.

Impedance is only meaningful when related to steady-state sinsusoidal conditions. In the interval immediately following a fault (typically one cycle of power frequency after fault inception), the waveforms derived from the section containing the fault contain a variety of transients which vary according to the power system operating conditions and configuration.

One consequence of the use of increasingly high voltages in transmission systems has been to increase the fault currents which can be produced and therefore reduce the maximum accpetable fault clearance time. It is therefore desirable to provide a protection arrangement which can operate using information derived during one cycle after fault inception. A system which operates within one cycle may be termed an ulta high speed (u.h.s) protection system. To operate within such time the measurement process should be completed within approximately 4.7 ms after a fault.

In UK Pat. No. 2016833, which formed the basis for U.S. Pat. No. 4,261,038 issued Apr. 7, 1981, to the same inventors as the present invention, there is described an apparatus for detecting the occurence of a fault in a section of an electrical power distribution system comprising means for measuring the instantaneous values of the voltage and current at a predetermined location, means for calculating an approximation to the Fourier transform of a window of the actual voltage waveform over a predetermined interval of time and a predetermined frequency, means for calculating an approximation to the Fourier transform of a window of the actual current waveform over said predetermined time interval and frequency, means for utilising the results of the calculation relating to the actual current waveform for calculating an approximation to the Fourier transform of the modified current which would flow if the voltage on each side of the time interval was zero, and means for calculating the actual impedance of the section from said Fourier transforms of the actual voltage and the modified current.

SUMMARY OF THE INVENTION

According to the present invention an apparatus for detecting the occurrence of a fault in a section of an electrical power supply system comprises means for measuring the values of the voltage and current at a predetermined location, means for filtering out high frequency components in the measured voltage and current, means for calculating an approximation to the Fourier transform of a window of the voltage waveform over a predetermined interval of time and at a predetermined frequency, said Fourier transform of the voltage waveform being modified by a continuous phase change at the said frequency, means for calculating an approximation to the Fourier transform of a window of the current waveform over the said time interval and at the said frequency, said Fourier transform of the current waveform being modified by a continuous phase change at the said frequency, and means for calculating the impedance of the section from said modified Fourier transforms of the voltage and the current waveforms.

Preferably the means for measuring the current and the means for measuring the voltage operate to convert said measured current and voltage to digital representation thereof and the filtering means operates on said digital representations.

BRIEF DESCRIPTION OF THE DRAWINGS

In order that the invention may be more fully understood reference will now be made to the accompanying drawings in which.

DETAILED DESCRIPTION OF THE INVENTION

Figure 2:
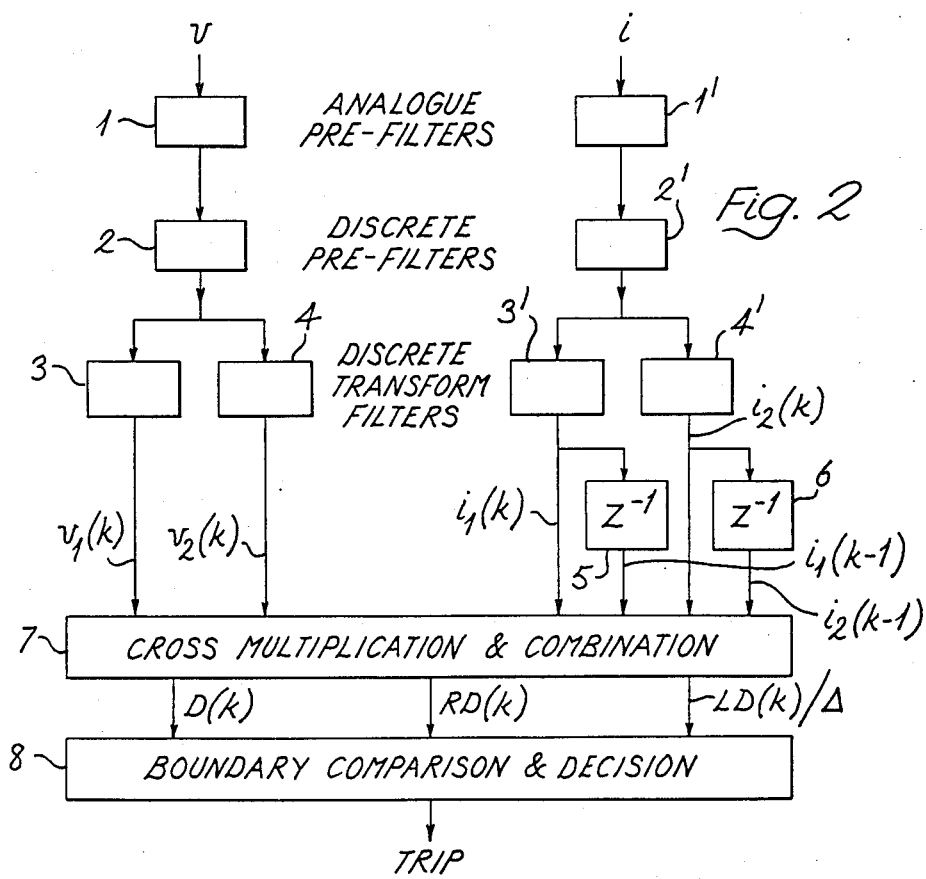
FIG. 2 is a schematic diagram of an embodiment of the invention.

The underlying mathematical principle is now described and a block diagram of the scheme is shown in FIG. 2. Each measured voltage or current signal is derived as a specially developed phase-modifed finite Fourier transform defined by equation (1) for the voltage signal:

$$v(j\omega,t) = \exp(j\omega t) \int_{t_1 = t - T}^{t_2 = t} v(\tau)\exp(-j\omega\tau)d\tau \quad (1)$$

A similar transformation is used for the current signal. The integral term can be seen to be the finite Fourier transform providing a spectral component at angular frequency $\omega$ of a window of the time varying relaying voltage v(t) for a period T prior to the present time t. The phase function exp (j$\omega$t) outside the integral rotates or phase modifies the spectral component without affecting its magnitude. Because the integral of equation (1) is performed with respect to the dummy variable $\tau$, the phase modifying function can be absorbed within the integral as in equation (2):

$$v(j\omega,t) = \int_{t-T}^{t} v(\tau)\exp[j\omega(t-\tau)]d\tau \quad (2)$$

Equation (2) is a convolution integral which may be written in the equivalent form:

$$v(j\omega,t) = \int_0^\infty v(t-\tau)\pi_{0(\tau)}^T \exp(j\omega\tau)d\tau \qquad (3)$$

where $\pi_{0(\tau)}^T$ is the rectangular window function given by:

$$\left.\begin{array}{l}\pi_{0(\tau)}^T = 1;\ 0 < \tau < T \\ \pi_{0(\tau)}^T = 0;\ T < \tau < 0\end{array}\right\} \qquad (4)$$

Equation (3) may be written as the summation of real and imaginary components $v_1(t)$ and $v_2(t)$ respectively, in the form:

$$v(j\omega,t) = v_1(t) + jv_2(t) \qquad (5)$$

where $$v_1(t) = \int_0^\infty v(t-\tau)\pi_{0(\tau)}^T \cos(j\omega\tau)d\tau \qquad (6)$$

$$v_2(t) = \int_0^\infty v(t-\tau)\pi_{0(\tau)}^T \sin(j\omega\tau)d\tau \qquad (7)$$

Equations (6) and (7) represent the convolution integrals of two linear time invariant filters with finite impulse responses $\pi_{0(\tau)}^T \cos(j\omega\tau)$ and $\pi_{0(\tau)}^T \sin(j\omega\tau)$ respectively. These integrals may be approximated by discrete summations of the form:

$$v_1(k) \approx h_{10}v(k) + h_{11}v(k-1) + \ldots h_{1n}v(k-m) \qquad (8)$$

$$v_2(k) \approx h_{20}v(k) + h_{21}v(k-1) + \ldots h_{2n}v(k-m) \qquad (9)$$

where k is a discrete integer variable and the weighting sequences are equal to the sampled continuous impulse responses and m is an integer such that $(m+1)\Delta = T$. In the above $\Delta$ is the sampling interval. Equations (8) and (9) contain the weighting sequences used in the discrete transform filters 3 and 4 to obtain the voltage signals $v_1(k)$ and $v_2(k)$. In a u.h.s. application, the measurement process should be completed in less than about 4.7 ms which precludes incurring the significant delays associated with narrow bandwidth anti-aliasing pre-filters. It follows that high sampling rates must be employed consistent with the broad bandwidth of a u.h.s. scheme and a suitable sampling rate is one of 4 kHz.

It is important that the transform window width T is kept small relative to the overall measurement process in order to avoid corruption of the post-fault impedance estimates by pre-fault signal data. It will be apparent from equations (8) and (9) that the transform window is a moving window of width T which is incremented in time steps corresponding to the smpling interval $\Delta$. A transform window width of 1.25 ms is convenient leading to a digital filter approximation using five samples at a 4 kHz rate. The extraction frequency $f = \omega/2\pi$ is in theory arbitrary, but practical numerical considerations lead to the choice of an extraction frequency given by $f = \frac{1}{2}T$ or 400 Hz. With these parameters, the weighting sequences of the discrete transform filters 3 and 4 are given by:

$$h_{10} = 1,\ h_{11} = -h_{14} = 0.809,\ h_{12} = -h_{13} = 0.309 \qquad (10)$$

$$h_{20}\ 0,\ h_{21} = h_{24} = 0.588,\ h_{22} = h_{23} = 0.951 \qquad (11)$$

It is assumed that the voltage and current at the point of measurement conform to the first-order differential equation:

$$v(t) = Ri(t) + Li'(t) \qquad (12)$$

where $i'(t)$ is the time derivative of the measured current $i(t)$. Application of the phase modified finite transform of equation (3) to equation (12) produces the relationship:

$$v(j\omega,t) = Ri(j\omega,t) + L\int_0^\infty i'(t-\tau)\pi_{0(\tau)}^T \exp(j\omega\tau)d\tau \qquad (13)$$

The second term on the right hand side of equation (13) is the complex output of two linear time invariant processes in the form of equations (6) and (7) with a combined input which is the derivative of the measured current $i(t)$. By the principle of differentiability applied to linear systems the order of differentiation and integration can be reversed such that equation (13) may be expressed in the form:

$$v(j\omega,t) = Ri(j\omega,t) + Li'(j\omega,t) \qquad (14)$$

where $i'(j\omega,t)$ is the time derivative of the term $i(j\omega, t)$ approximated by the discrete filtering process provided by the current discrete transform filters 3' and 4' for the real current samples $i_1(k)$ and the imaginary current samples $i_2(k)$ respectively corresponding to the voltage discrete transform filters 3 and 4 the characteristics of which were described in the previous section. Using the discrete variable k the following approximatation can be used:

$$i'(j\omega,k) \approx (1/\Delta)[i(j\omega,k) - i(j\omega,k-1)] \qquad (15)$$

where $\Delta$ is the sampling interval. The last term in equation (15) is implemented by the one sample delays 5 and 6 which are described in the frequency domain by the term $z^{-1}$. Equation (14) can be written:

$$v(j\omega,k) = \left(R + \frac{L}{\Delta}\right) i(j\omega,k) - \frac{L}{\Delta} i(j\omega,k-1) \qquad (16)$$

Equation (16) expands into real and imaginary parts $v_1(k)$ and $v_2(k)$ respectively, in the form:

$$\begin{bmatrix} v_1(k) \\ v_2(k) \end{bmatrix} = \begin{bmatrix} i_1(k) & -i_1(k-1) \\ i_2(k) & -i_2(k-1) \end{bmatrix} \begin{bmatrix} R + L/\Delta \\ L/\Delta \end{bmatrix}$$

and by inversion expressions (18) to (21) can be derived.

$$D(k) = i_2(k)\, i_1(k-1) - i_1(k)\, i_2(k-1) \qquad (18)$$

$$(R + L/\Delta)D(k) = v_2(k)\, i_1(k-1) - v_1(k)\, i_2(k-1) \qquad (19)$$

$$(L/\Delta)D(k) = v_2(k)\, i_1(k) - v_1(k)\, i_2(k) \qquad (20)$$

$$RD(k) = (R + L/\Delta)D(k) - (L/\Delta)D(k) \qquad (21)$$

Equations (18) to (21) are implemented by the Cross Multiplication and Combination facility 7 to derive the terms D(k), RD(k) and LD(k)/$\Delta$.

By dividing equations (20) and (21) by equation (18), it is possible to derive estimates for R and L directly from present and past values output from the discrete filter finite transform process.

The first order approximation of equation (12) utilising the 50 Hz line parameters is not acceptable over the whole range of frequencies. High frequency components caused by fault induced travelling waves in the primary system cannot be avoided and it has therefore been necessary to pre-filter the relaying voltages and currents in such a way as to bandlimit their frequency content before the algorithm is implemented.

A further important practical consideration concerns the behaviour of the time variant determinant term D(k) involved in estimating R and L. Under conditions of strong exponential offset of the relaying currents, the determinant term can approach or traverse a zero value, and the computations of equations (18) to (21) become ill-behaved as the value of D(k) decreases. The best performance is attainable with the offset completely removed, although exponential components of less than about 50% give rise to a variation of D(k) which is sufficiently high and positive to provide consistent estimates of R and L.

In the block diagram of the scheme shown in FIG. 2 the voltage signal pre-conditioning necessary to meet the above requirements is performed by means of a specially synthesised pre-filter combination comprising a second-order low-pass Butterworth analogue filter 1 and a discrete sampling finite impulse response filter 2. The analogue filter 1 is set to have a cut-off frequency of one quarter of the discrete process sampling rate which adequately meets the requirements for band limiting the signals prior to sampling as required to overcome aliasing errors. The finite impulse response discrete pre-filter transfer function of the discrete pre-filter 2 takes the form of equation (22).

$$H(z) = (1 + z^{-1} + z^{-2} + z^{-3})(1 - z^{-5}) \quad (22)$$

which has zero response to frequencies n/5 and n/4 of the sampling rate where n is an integer (n≥0).

The current signal i is subjected to a similar preconditioning by means of a similar analogue pre-filter 1' and discrete pre-filter 2' of similar transfer function to filter 2.

Figure 1:
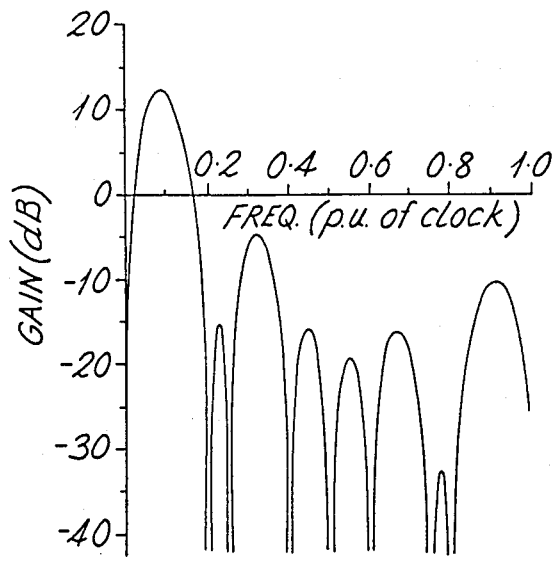
FIG. 1 shows a curve of the frequency response of the filter.

FIG. 1 shows the combined frequency response of the Butterworth analogue filter 1 and the above discrete filter process of pre-filter 2. The infinite attenuation occurring at zero frequency meets the requirements for limiting the effects of exponential offset components on the determinant term D(k) as discussed previously. It will be appreciated that other zeros in the frequency response can be optimally positioned by adjusting the sampling frequency. In particular, the pre-filter presents an attenuation of at least 15 dB for frequencies between about 0.19 and 0.27 of the sampling rate. It is well known that although fault generated high frequency transients theoretically contain spectral components throughout the whole spectrum, they are in almost all applications nevertheless largely characterised by travelling waves in transit between the fault and the relay point. In a particular application, therefore, the frequency of these dominant travelling wave components corresponding to a fault at the critical reach point of the distance relay is known and it is possible to adjust the discrete filtering sampling rate such that these components fall within the 15 dB attenuation band. By this means the requirements in respect of high frequency signal components discussed above can be met.

Figure 3:
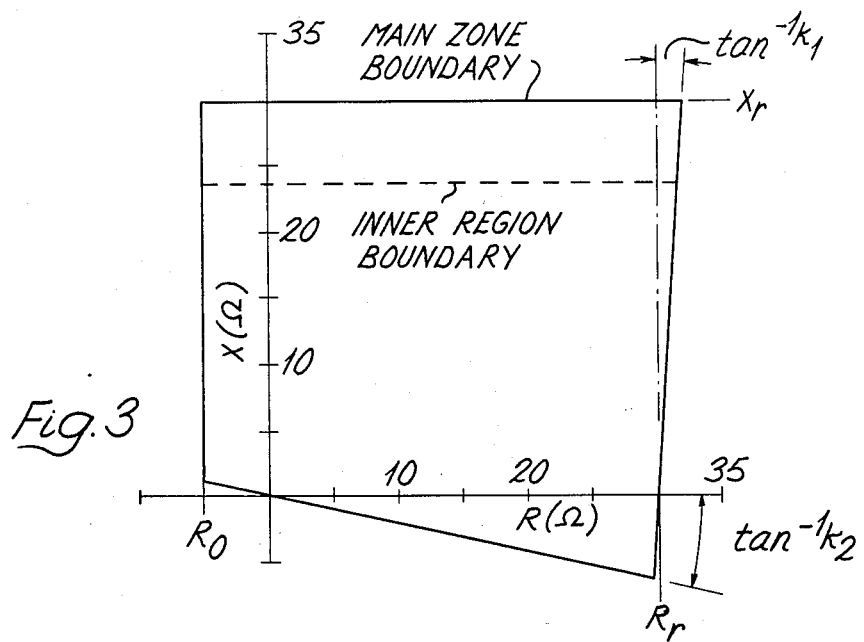
FIG. 3 shows the tripping characteristics of the relay.

A quadrilateral type tripping characteristic is shown in FIG. 3. Briefly, estimates of reactance $\omega_o L$, where $\omega_o$ is the angular power frequency, and resistance R are checked against the quadrilateral boundary by use of the constraints defined in expressions (23) and (24).

$$k_2 R < \omega_o L < X_r \quad (23)$$

$$R_o < R < R_r + k_1 \omega_o L \quad (24)$$

It is possible to simplify the computations involved in the boundary checking process by multiplying expressions (23) and (24) throughout by positive term D(k), and dividing expression (23) by $\omega_o \Delta$ to give:

$$k_3 R D(k) < L D(k)/\Delta < k_4 D(k) \quad (25)$$

$$R_o D(k) < R D(k) < R_r D(k) + k_5 L D(k)/\Delta \quad (26)$$

where $k_3 = k_2/\omega_o \Delta$, $k_4 = X_r/\omega_o \Delta$ and $k_5 = k_1 \omega_o \Delta$. The impedance boundary checks of expressions (25) and (26) can be performed by scalar comparisons of the discrete signal products detailed in equations (18) to (21) and is carried out by the Boundary Comparison and Decision facility 8.

Provision should be made for the possibility of faults external to the protected zone causing transient impedance estimates falling within the relay characteristic. It is necessary therefore to base a trip decision on the occurrence of several impedance estimates falling within the protected zone. This decision process is implemented in facility 8 and uses a counter which is incremented when an impedance estimate falls within the relay characteristic and decremented by one when an estimate falls outside. A second reactance boundary line at 80% of the main zone reach, shown in FIG. 3, is used to control counter incrementing such that reactance estimates below this level cause counter incrementing by two and reactance estimates within the last 20% of the relay reach causes counter incrementing by one. A trip signal is issued when the counter reaches a level of 9 and the counter is subject to a minimum level of zero. This process has been found to improve the relay speed in the case of a well defined, in-zone fault condition. This inner region boundary entails use of an additional check similar to expression 25, but using a smaller $K_4$ constant.

In those applications where there is a possibility of a fault close to a relay location causing collapse of the measured voltage to a value below the sensitivity of the relay, it is possible to directionalise the measurement by adding a memory derived pre-fault system voltage component to the measured voltage. The estimates of reactance $\omega_o L$ determined from equation (20) when using the system voltage with added memory derived voltage component and the measured current signal then attain positive and negative values for faults on the line and behind the relay locations respectively. The direction to the fault is thus determined and circuit breaker tipping inhibited for negative values of measured reactance $\omega_o L$.

Figure 4:
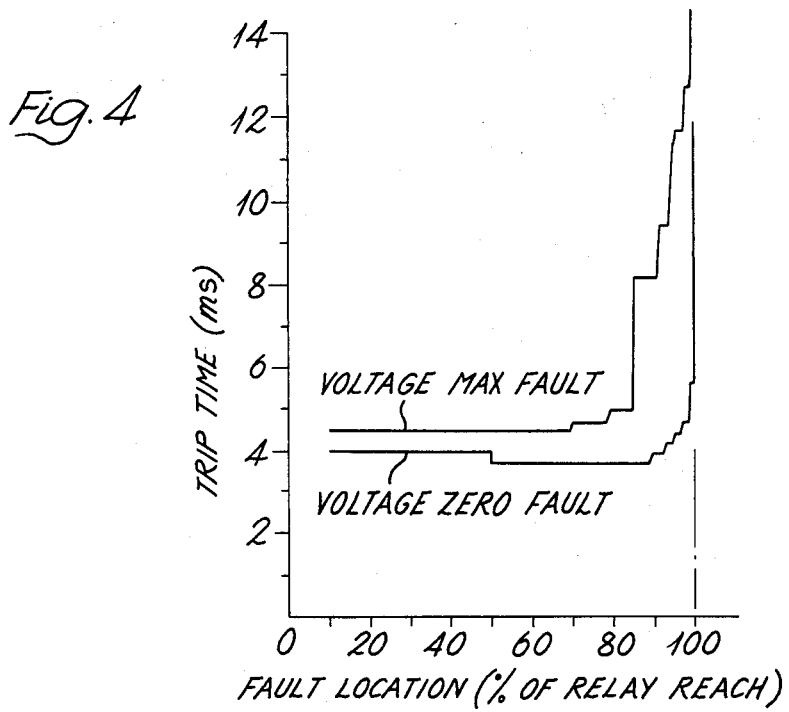
FIG. 4 shows typical relay response times under varying conditions.

The performance of the relay is demonstrated in FIG. 4 for single phase to earth faults on a 129 km, 400 kV line fed from a source of 5 GVA. The relay reach is set to 80% of the line length where fault induced travelling wave transients give rise to dominant signal components of the order of 900 Hz. A pre-filter discrete sample rate of 4 kHz therefore ensures that such components fall within the high attenuation band. FIG. 4 shows the relay operating times for faults at voltage maximum and voltage zero point on wave. Both curves show the relay operating time to be within the desired time of 4.7 ms for all faults up to 70% at the relay reach. In the case of voltage zero faults, this performance is achieved for faults up to and beyond 90% of the reach. The sharp rise in the operating time beyond 85% for the voltage maximum fault displays the influence of small high frequency transients penetrating the pre-filter processes and slowing down the trip decision. The voltage zero fault curve does not display this characteristic to the same extent because of the much smaller travelling wave components in the primary quantities. Both curves are free from over-reaching phenomena which, in the case of the voltage zero fault, shows good behaviour of the process in the presence of exponential signal offset components.

We claim:

1. Apparatus for detecting the occurrence of a fault in a section of an electrical power supply system comprising:

means for measuring the values of the voltage and current at a predetermined location to develop measured voltage and current representations, means for filtering out high frequency components in the measured voltage and current representations, means for calculating an approximation to the Fourier transform of a moving window of the filtered voltage representation over a predetermined interval of time and at a predetermined frequency, said Fourier transform of the voltage representation being modified by a continuous phase change at the said frequency, means for calculating an approximation to the Fourier transform of a moving window of the filtered current representation over the said time interval and at the said frequency, said Fourier transform of the current representation being modified by a continuous phase change at the said frequency, means for calculating the impedance of said section from said modified Fourier transforms of the voltage and current representations, and means for generating a trip signal when the value of said calculated impedance indicates a fault.

2. Apparatus as claimed in claim 1 in which the voltage and current measuring means include means to convert the measured current and voltage representations to digital representations thereof and the filtering means comprises means for digital filtering.

3. Apparatus as claimed in claim 1 in which each of the said calculating means comprises a respective parallel connection of a linear time invariant filter with finite cosine response and a linear time invariant filter with finite sine impulse response.

4. A method for detecting the occurrence of a fault in a section of an electrical power supply system comprising the steps of:

measuring the values of the voltage and current at a predetermined location to develop measured voltage and current representations, filtering out high frequency components in the measured voltage and current representations, calculating an approximation to the Fourier transform of a moving window of the filtered voltage representation over a predetermined interval of time and at a predetermined frequency, said Fourier transform of the voltage representation being modified by a continuous phase change at the said frequency, calculating an approximation to the Fourier transform of a moving window of the filtered current representation over the said time interval and at the said frequency, said Fourier transform of the current representation being modified by a continuous phase change at the said frequency, calculating the impedance of said section from said modified Fourier transforms of the voltage and current representations, and generating a trip signal when the value of said calculated impedance indicates a fault.

5. A method for detecting the occurrence of a fault in a section of an electrical power supply system comprising the steps of:

measuring the values of the voltage and current at a predetermined location to develop measured voltage and current representations, converting the measured current and voltage representations to digital representations thereof, digitally filtering out high frequency components in the measured voltage and current representations, calculating an approximation to the Fourier transform of a moving window of the filtered voltage representation over a predetermined interval of time and at a predetermined frequency, said Fourier transform of the voltage representation being modified by a continuous phase change at the said frequency, calculating an approximation to the Fourier transform of a moving window of the filtered current representation over the said time interval and at the said frequency, said Fourier transform of the current representation being modified by a continuous phase change at the said frequency, calculating the impedance of said section from said modified Fourier transforms of the voltage and current representations, and generating a trip signal when the value of said calculated impedance indicates a fault.

* * * * *